United States Patent
Peterson et al.

(10) Patent No.: US 6,222,344 B1
(45) Date of Patent: Apr. 24, 2001

(54) MAGNETICALLY COUPLED AUTONOMOUS BATTERY EQUALIZATION CIRCUIT

(75) Inventors: William Anders Peterson, Vestal; Garey George Roden, Apalachia, both of NY (US)

(73) Assignee: BAE Systems Controls, Inc., Johnson City, NY (US)

( * ) Notice: Subject to any disclaimer, the term of this patent is extended or adjusted under 35 U.S.C. 154(b) by 0 days.

(21) Appl. No.: 09/456,078

(22) Filed: Dec. 6, 1999

(51) Int. Cl.$^7$ .......................... H01M 10/44; H01M 10/46
(52) U.S. Cl. ............................................................. 320/119
(58) Field of Search ........................... 320/110, 116, 320/118, 119, 120

(56) References Cited

U.S. PATENT DOCUMENTS

| | | |
|---|---|---|
| 4,079,303 | 3/1978 | Cox . |
| 4,502,001 | 2/1985 | Galloway . |
| 4,949,028 | 8/1990 | Brune . |
| 4,967,136 | 10/1990 | Nofzinger . |
| 5,003,244 | 3/1991 | Davis, Jr. . |
| 5,479,083 | 12/1995 | Brainard . |
| 5,528,122 | 6/1996 | Sullivan et al. . |
| 5,710,504 | 1/1998 | Pascual et al. . |
| 5,742,150 | 4/1998 | Khuwatsamrit . |
| 5,821,729 | 10/1998 | Schmidt et al. . |

OTHER PUBLICATIONS

The Use Of Equalizing Converters For Serial Charging Of Long Battery Strings, by D.C. Hopkins, C.R. Mosling, and S.T. Hung, Department of Electrical Engineering, Auburn University, pp. 493–498. No Date.

Charge Equalization For Series Connected Battery Strings, Nasser H. Kutkut, Deepak M. Divan, Donal W. Novotny, Department of Electrical and Computer Engineering, University of Wisconsin, 1944 IEEE, pp. 1008–1015.

Design Considerations For Charge Equalization Of An Electric Vehicle Battery System, Nasser H. Kutkut, H.L.N. Wiegman, Deepak M. Divan, D. W. Novotny, Departement of Electrical and Computer Engineering, University of Wisconsin, 1995 IEEE, pp. 96–103.

Power Electronics, Converters, Applications, and Design Second Edition, Resonant Converters: Zero–Voltage And/Or Zero–Current Switchings, Chapter 9, pp. 249–297. 1989.

*Primary Examiner*—Edward H. Tso
(74) *Attorney, Agent, or Firm*—Geopprey H. Krauss

(57) ABSTRACT

A battery equalization circuit for equalizing charge between at least first and second series-connected batteries, where each battery has a positive end and a negative end, with the positive end of the second battery coupled to the negative end of the first battery at a common node, and using: a switching circuit connectable to the positive end of the first battery at a positive node and the negative end of the second battery at a negative node; a transformer having first and second magnetically coupled windings, each with a first end defining a polarity of the winding and a second opposing end; and a transformer reset circuit coupled from the windings of the transformer to the positive and negative nodes. The switching circuit acts to simultaneously couple the first and second windings in parallel with the first and second batteries, respectively, in the same polarity such that a charge is transferred between the first and second batteries as a function of a charge imbalance therebetween. The transformer reset circuit couples one of the first and second windings in parallel with one of the first and second batteries in an opposite polarity to direct reset current from the transformer to that battery to decrease the charge imbalance therebetween.

42 Claims, 5 Drawing Sheets

MAGNETICALLY COUPLED AUTONOMOUS BATTERY EQUALIZATION CIRCUIT

BACKGROUND OF THE INVENTION

1. Field of the Invention

The present invention relates to battery equalization techniques and, more particularly, to magnetically-coupled battery equalization apparatus suitable for autonomous connection to batteries.

2. Related Art

To generate higher voltage than available from a single battery, plural batteries are typically connected in series such that a relatively large total voltage is available to drive a load. As it is desirable to utilize rechargeable batteries, battery charger circuits have been developed which charge all of the batteries in a series string at one time.

Care must be taken to fully charge each battery in the series string without one battery being at a higher state of charge than another battery. If a difference exists between a relatively low charge on one battery with respect to the other batteries in the series, the total effective capacity of the series string of batteries is reduced to the capacity of the battery having the low state of charge.

Battery equalization circuits have been developed to ensure that all batteries in a series string attain substantially the same state of charge. U.S. Pat. No. 5,479,083 to Brainard illustrates a conventional battery equalization circuit which includes a pair of series-coupled transistors connected across a pair of series-coupled batteries. An inductor L is connected between the pair of transistors and the batteries. An oscillator produces gate drive signals to the transistors such that they are alternately biased on and off for substantially equal durations. The inductor operates as a non-dissipative shunt that is alternately switched in parallel with each battery such that excessive charge on one battery is transferred to the other battery. Unfortunately, component tolerances within the Brainard equalization circuit will effect the degree of equalization achieved between the batteries, particularly tolerances which effect the duty cycle of the oscillator and the resultant duty cycle presented by the transistors to the batteries. Therefore, in order to obtain satisfactory equalization, measurements of the charge on each battery must be obtained and fed-back to the oscillator to change the duty cycle as necessary (see FIG. 3 of the Brainard patent).

U.S. Pat. No. 5,710,504 to Pascual discloses a battery equalization circuit which does not require a feedback mechanism from each battery to achieve adequate equalization. However, the circuit of the Pascual patent requires that all switching devices within the circuit be synchronized, no matter how many batteries are in the series combination. When the number of series-coupled batteries is relatively high and results in a high terminal voltage from the uppermost battery to the lowermost battery, the topology of the Pascual circuit may result in undesirable fault conditions.

Turning to FIG. 1 of the Pascual patent, a plurality of series-coupled batteries are shown; all switches 16 are synchronized via control lines 18 and control unit 12. Assuming that the total voltage from the uppermost battery to the lowermost battery is substantially large (e.g., 600 volts), a practical circuit must be designed to withstand a fault from the uppermost battery terminal to the lowermost battery terminal through the wiring of the equalization circuit. Often, the series coupled batteries may deliver many amps (approaching 1000 amps or more) making it difficult to design for surviving a fault and not damaging any of the batteries.

U.S. Pat. No. 5,821,729 to Schmidt discloses a method and apparatus for exchanging charge between a plurality of batteries, where transformer windings are connected in parallel with each battery at predetermined time intervals. Each battery is simultaneously connected to a respective one of the windings in the same winding sense. Unfortunately, the Schmidt apparatus requires precise timing of switching elements which connect the windings to the respective batteries. Indeed, if the timing of the switching elements is not tightly controlled, the common magnetic core of the transformer windings will saturate.

Accordingly, there is a need in the art for a new battery equalization circuit which is capable of autonomous operation (i.e., not requiring synchronization with other equalization circuits servicing the series-coupled batteries) and does not require closed loop compensation or overly complex control circuitry to achieve satisfactory equalization.

SUMMARY OF THE INVENTION

In accordance with the present invention, to overcome the disadvantages of the prior art, a battery equalization circuit is provided for equalizing charge between at least first and second series-connected batteries, with each battery including a positive end and a negative end, where the positive end of the second battery is coupled to the negative end of the first battery at a common node. The battery equalization circuit of the present invention comprises: a switching circuit connectable to (i) the positive end of the first battery at a positive node, and (ii) the negative end of the second battery at a negative node; a transformer having first and second magnetically coupled windings, each winding having a first end defining a polarity of the winding and a second opposing end; and a transformer reset circuit coupled from the windings of the transformer to the positive and negative nodes, the switching circuit being operable to simultaneously couple the first and second windings in parallel with the first and second batteries, respectively, in the same polarity such that a charge is transferred between the first and second batteries as a function of a charge imbalance therebetween, and the transformer reset circuit being operable to couple one of the first and second windings in parallel with one of the first and second batteries in an opposite polarity to direct reset current from the transformer to that battery to decrease the charge imbalance therebetween.

According to another aspect of the invention, the battery equalization circuit includes a first switching transistor connectable at one end to the positive end of the first battery at a positive node; a second switching transistor connectable at one end to the negative end of the second battery at a negative node; a transformer having first and second magnetically coupled windings, each winding having a first end defining a polarity of the winding and a second opposing end such that: (i) the first end of the first winding is coupled to an opposing end of the first switching transistor, (ii) the second end of the second winding is coupled to an opposing end of the second switching transistor, and (iii) the second end of the first winding is coupled to the first end of the second winding; a first diode having an anode coupled to the second end of the second winding and a cathode coupled to the positive node; a second diode having an anode coupled from the negative node and a cathode coupled to the first end of the first winding; and a drive circuit operable to bias the switching transistors ON and OFF substantially simultaneously at ON and OFF times, respectively, and at a duty cycle of less than about 50%.

The invention further provides a method of equalizing charge between the first and second series connected batteries, by using the steps of: simultaneously connecting a different one of first and second magnetically coupled windings of a transformer in parallel with an associated one of the first and second batteries, respectively, in the same polarity such that that one of the first and second batteries having greater charge drives a current into a corresponding one of the first and second windings, to cause an induced current to flow out of the other of the first and second windings and into the other one of the first and second batteries having a lesser charge, such that charge between the first and second batteries tends to equalize; simultaneously disconnecting the first and second windings of the transformer from the first and second batteries; and providing a current path for a reset current to flow through the corresponding one of the first and second windings and into the other of the first and second batteries having lesser charge such that charge between the first and second batteries tends to equalize.

According to still another aspect of the invention, the battery equalization circuit includes: a transformer having first and second magnetically coupled windings, each winding having a first end defining a polarity of the winding and a second opposing end; a first capacitor; a transformer reset circuit coupled from the first winding of the transformer to the positive node; and a switching circuit operable during ON times to (i) simultaneously couple the first and second windings in parallel with the first and second batteries, respectively, in the same polarity; and (ii) couple the first capacitor in parallel with the first winding.

According to a further aspect of the invention, the battery equalization circuit includes: a transformer having first and second magnetically coupled windings, each winding having a first end defining a polarity of the winding and a second opposing end; a first capacitor; a second capacitor coupled from the positive node to the common node; a transformer reset circuit coupled from the first winding of the transformer to the positive node; and a switching circuit operable during ON times to (i) simultaneously couple the first and second windings in parallel with the first and second batteries, respectively, in the same polarity; and (ii) couple the first capacitor in parallel with the first winding.

Other objects, features, and advantages of the present invention will now become apparent to those skilled in the art upon reading the teachings herein, when taken in conjunction with the accompanying drawings.

BRIEF DESCRIPTION OF THE DRAWINGS

For the purposes of illustrating the invention, there are shown in drawing forms which are presently preferred, it being understood, however, that the present invention is not limited to the precise arrangements and instrumentalities shown.

DETAILED DESCRIPTION OF THE PREFERRED EMBODIMENTS

Figure 1:
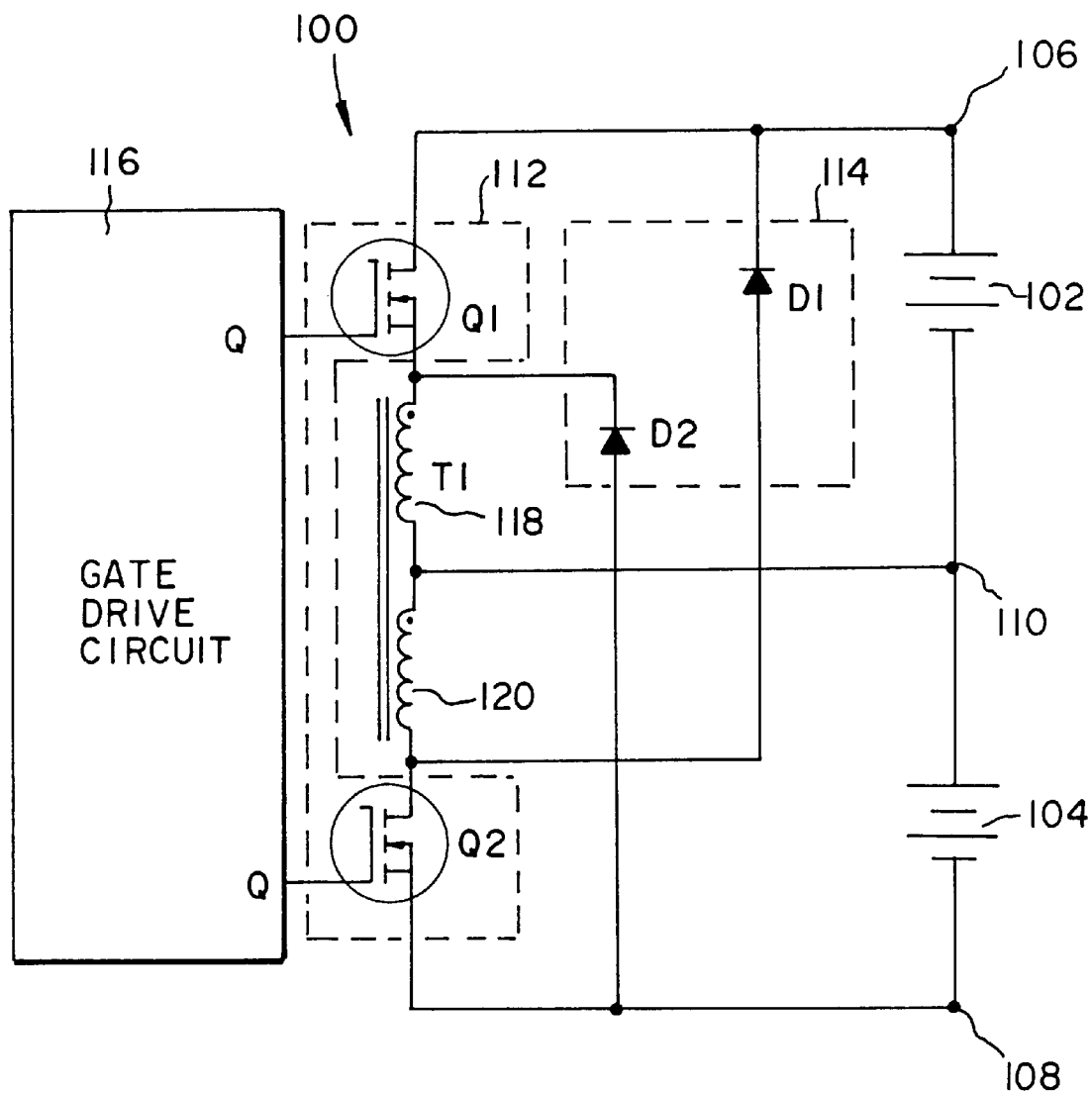
FIG. 1 is a battery equalization circuit schematic according to one aspect of the present invention.

With reference to the accompanying drawing, wherein like numerals indicate like elements, there is shown in FIG. 1 a circuit diagram illustrating a charge equalization circuit 100 according to one aspect of the present invention.

The charge equalization circuit 100 is operable to equalize the charge contained on respective series-coupled batteries 102 and 104. Battery 102 includes a positive end coupled to positive node 106 and a negative end coupled to a common node 110. Battery 104 includes a positive end coupled to common node 110 and a negative end coupled to negative node 108.

Those skilled in the art will appreciate that the charge equalization circuit 100 of the present invention need not operate with two completely-independent batteries, such as separate batteries 102 and 104, but may also operate with the individual cells within a particular single battery unit. In such a case, battery 102 and battery 104 may be thought of as individual series-coupled cells within one battery unit.

The charge equalization circuit 100 according to the present invention includes a switching circuit 112 connectable to the series coupled batteries 102, 104 by way of the positive node 106 and the negative node 108. The charge equalization circuit 100 also includes a transformer T1, a transformer-reset circuit 114, and a gate drive circuit 116. The transformer T1 includes an upper winding 118 and a lower winding 120 wound on a common core. Each winding 118, 120 includes an end shown with a dot to indicate the polarity (or sense) associated with that winding.

The switching circuit 112 preferably includes upper and lower switching transistors Q1, Q2 each having a controlled-conduction circuit (e.g. the source-drain circuit) coupled series with an associated one of the upper and lower windings 118, 120 of transformer T1. Transistors Q1, Q2 are preferably MOSFET devices; however, those skilled in the art will understand that other types of switching transistors may be utilized without departing from the scope of the invention. A drain of transistor Q1 is connected to positive node 106, while a source of transistor Q1 is connected to one end of upper winding 118. A source of transistor Q2 is coupled to negative node 108, while a drain of transistor Q2 is coupled to a lower end of lower winding 120. Upper and lower windings 118, 120 are connected together at common nod 110.

The gate drive circuit 116 includes two outputs, each output for biasing a respective one of transistors Q1 and Q2 on and off at a selected duty cycle. It is preferred that this duty cycle be less than about 50% to ensure that transformer TI will not saturate. Indeed, the circuit is fully operational for any duty cycle of less than 50% (e.g. duty cycles of 10%, 20% or 49% are all usable).

The transformer reset circuit 114 is coupled from the windings 118, 120 of the transformer TI to the positive and negative nodes 106, 108. Reset circuit 114 preferably includes a pair of diodes D1, D2. The anode of diode D1 is connected to the junction of lower winding 120 and the drain of switching transistor Q2, while its cathode is connected to positive node 106. The anode of diode D2 is coupled to negative node 108, and its cathode is connected to the junction of the source of transistor Q1 and upper winding 118.

The switching circuit 112 is preferably operable to substantially simultaneously couple the upper and lower windings 118, 120 in parallel with the upper and lower batteries 102, 104, respectively, in the same polarity (i.e., with the dot of each winding connected to a positive end of the respective battery). In other words, gate drive circuit 116 simultaneously turns on transistors Q1 and Q2: conduction of transistor Q1 causes upper winding 118 to be connected in parallel with upper battery 102 such that the dot end of upper winding 118 is connected to the positive end of upper battery 102; and, substantially simultaneously, conduction of transistor Q2 causes lower winding 120 to be connected in parallel with lower battery 104 with the dot end of lower winding 120 connected to the positive end of lower battery 104.

When transistors Q1 and Q2 are ON (i.e., during an ON time), upper battery 102 and lower battery 104 respectively attempt to drive current into upper winding 118 and lower winding 120, respectively. Assuming, for example, upper battery 102 has a higher charge (i.e., a higher voltage potential), a current will flow from the positive end of upper battery 102, through transistor Q1, into upper winding 118, and back into the negative end of upper battery 102. Lower battery 104, therefore, will not be able to oppose an induced current flowing out of the dot end of lower winding 120 and into the positive end of lower battery 104. This effectively transfers charge from upper battery 102 to lower battery 104 during,ON times. Those skilled in the art will appreciate that if lower battery 104 had a greater charge than upper battery 102, then the current flow directions would be opposite in upper and lower windings 118, 120 of transformer T1 and an induced current would flow into the positive terminal of upper battery 102 in response to a drive current flowing out of the positive end of lower battery 104 into the dot end of lower winding 120.

Assuming, again, that upper battery 102 has a greater charge than lower battery 104, during the ON times of switching circuit 112, the drive current flowing from battery 102 into the dot end of upper winding 118 charges the magnetizing inductance of transformer T1, thereby storing energy in transformer T1. When the gate drive circuit 116 biases transistors Q1 and Q2 OFF (i.e., during OFF times), the transformer reset circuit 114 is preferably operable to directly reset current (i.e., current induced by a collapsing magnetic field in the core of transformer T1) to the battery having a lower charge, here, lower battery 104. In particular, reset current will flow out of the lower end of upper winding 118 of transformer T1 into the positive end of lower battery 104, through diode D2 and back into the dot end of upper winding 118. In effect, during the OFF time, the transformer reset circuit 114 is operable to couple the lower battery 104 in parallel with upper winding 118 in an opposite polarity than during the ON time. Advantageously, the reset current is used to equalize charge between upper battery 102 and lower battery 104 during OFF times.

Those skilled in the art will appreciate that reset current will be directed into each of upper and lower batteries 102 and 104 via diode D1 and D2 when upper and lower batteries 102 and 104 have substantially the same charge (i.e., when they are equalized).

Figure 2:
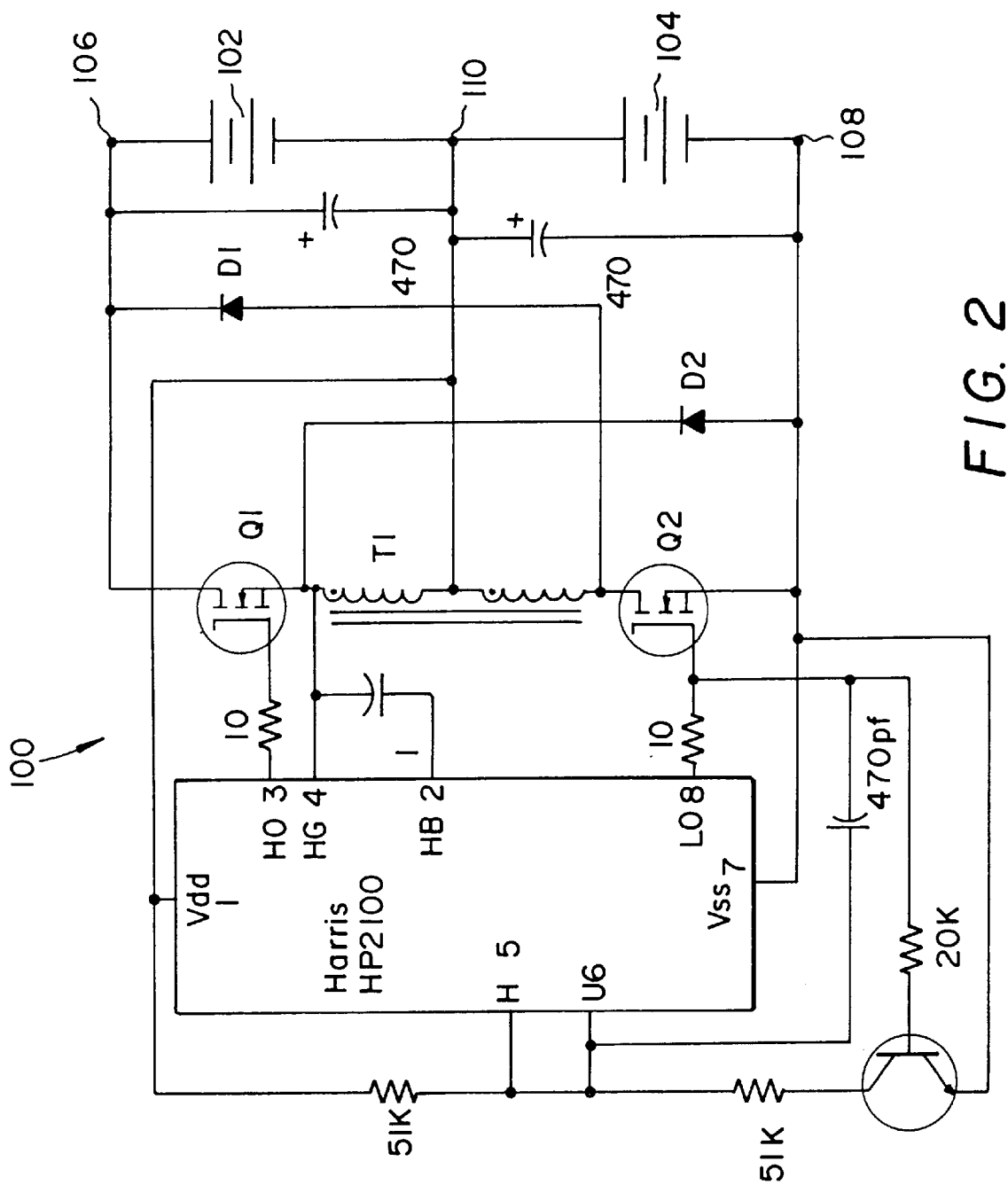
FIG. 2 is a more detailed schematic of the charge equalization circuit of FIG. 1.

Reference is now made to FIG. 2 which is a more detailed schematic of the charge equalization circuit 100 of FIG. 1. Those skilled in the art will appreciate that the particular components of FIG. 2 are shown by way of example only and that many other modifications and variations may be made in the circuit without departing from the scope of the invention.

Figure 3:
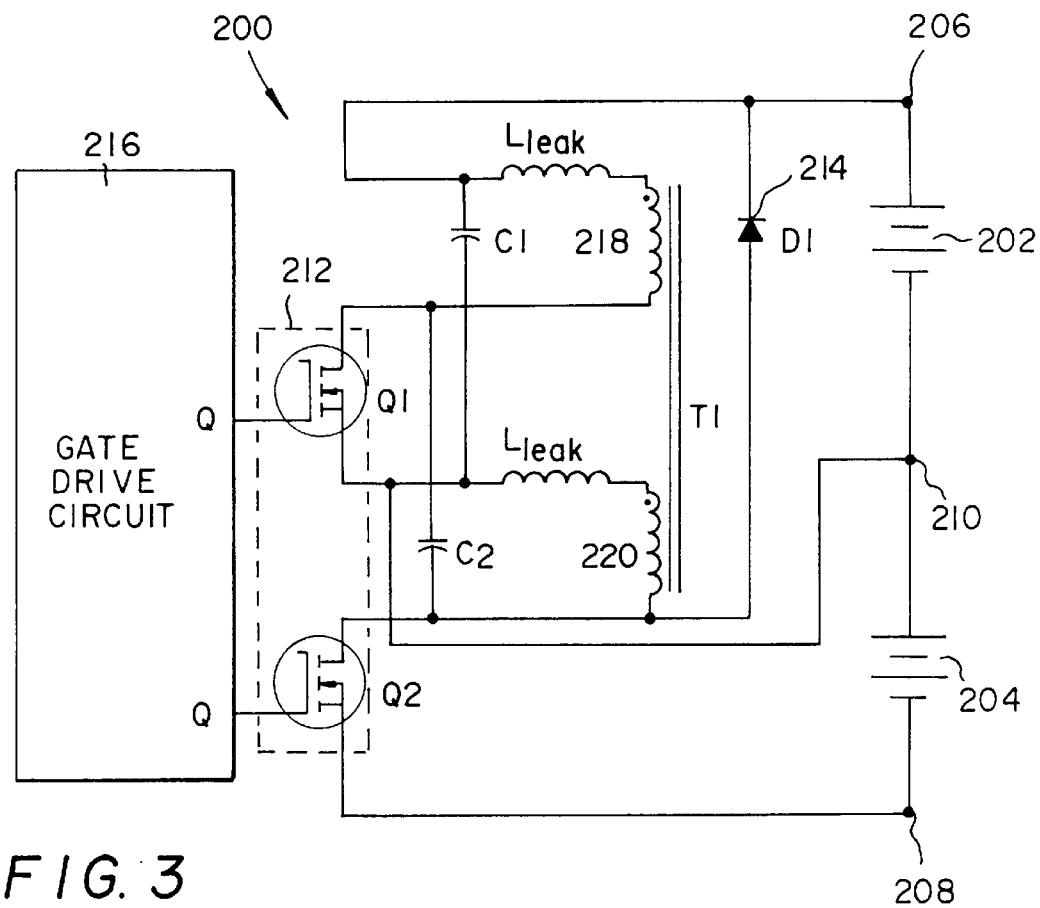
FIG. 3 is a battery equalization circuit schematic according to another aspect of the present invention.

Reference is now made to FIG. 3, which illustrates a charge equalization circuit 200 in accordance with another aspect of the present invention. The charge equalization circuit 200 is connectable to a series-coupled pair of batteries including an upper battery 202 and a lower battery 204 at positive, negative, and common nodes 206, 208, and 210, respectively. The charge equalization circuit includes a switching circuit 212, a transformer T1, a transformer reset circuit 214, and a gate drive circuit 216.

Each of upper and lower windings 218, 220 of transformer T1 are shown with a parasitic leakage inductance ($L_{leak}$) connected in series therewith. Those skilled in the art will appreciate that, in a practical transformer, any leakage inductance is a non-ideal circuit element and generally results in reduced circuit performance. In the case of charge equalization circuits utilizing transformers, leakage inductance generally limits the magnitude of current and charge which may be drawn from one battery and delivered to another battery. Indeed, the drive current from the battery having greater charge is limited by the combined impedance of that battery, the transformer winding, the switching circuit, and impedance of other circuit components reflected by way of transformer action.

Unfortunately, the parasitic leakage inductance cannot be reduced without corresponding negative effects in the transformer, such as reducing the magnetizing inductance and increasing magnetizing energy. Prior art methods of reducing leakage inductance without corresponding reductions in magnetizing inductance (and increases in magnetizing energy) have focused on improving the magnetizing inductance-to-leakage inductance ratio of the transformer by complex winding configurations, such as the use of coaxial windings.

The switching circuit 212 preferably includes upper and lower switching transistors Q1, Q2 coupled in series with the upper and lower windings 218, 220 of transformer T1. Transistors Q1, Q2 are preferably MOSFET devices; however, those skilled in the art will understand that other types of switching transistors may be utilized without departing from the scope of the invention. The switching circuit 212 is preferably operable to simultaneously couple the upper and lower windings 218, 220 (and associated leakage inductances) in parallel with the upper and lower batteries 202, 204, respectively in the same polarity. Transistor Q2 is connected in substantially the same way to transformer T1 and lower battery 204 as in the equalization circuit 100 of FIG. 1. Transistor Q1, however, is connected between upper and lower windings 218, 220 with the drain connected to a lower end of upper winding 218 and the source coupled toward the dot end of lower winding 220, it being understood that the leakage inductance is distributed throughout the lower winding 220. The dot end of upper winding 218 is coupled to the positive node 206, and to the positive end of upper battery 202 when upper battery 202 is connected to the equalization circuit 200.

An upper capacitor C1 is connected from the positive node 206 to the junction of: (i) the source of transistor Q1; (ii) the dot end of lower winding 220; and (iii) the common node 210. Those skilled in the art will appreciate that upper capacitor C1 is effectively connected in parallel with battery 202. A lower capacitor C2 is connected from the junction of upper winding 218 and the drain of transistor Q1 to the junction of lower winding 220 and the drain of transistor Q2.

Preferably, the transformer reset circuit 214 includes a diode D1 having an anode connected to the junction of lower winding 220, capacitor C2 and the drain of transistor Q2. The diode D1 also includes a cathode coupled to positive node 206.

The gate drive circuit 216 is preferably operable to bias transistors Q1 and Q2 (i) ON substantially simultaneously during ON times; and (ii) OFF substantially simultaneously during OFF times. When transistors Q1 and Q2 are ON, the upper and lower windings 218, 220 are coupled in parallel with upper and lower batteries 202, 204, respectively. Further, lower capacitor C2 is coupled in parallel with lower battery 204. Thus, upper capacitor C1 and lower capacitor C2 will charge or discharge such that their terminal voltages match the respective voltages of batteries 202 and 204. When transistors Q1 and Q2 are ON (i.e., during an ON time), upper battery 202 and lower battery 204 attempt to drive current into upper winding 218 and lower winding 220, respectively. Assuming, for example, upper battery 202 has a higher charge (i.e., a higher voltage potential thereacross), a current will flow from the positive end of upper battery 202, into upper winding 218, through transistor Q1, and back into a negative end of upper battery 202. Lower battery 204, therefore, will not be able to oppose an induced current flowing out of the dot end of lower winding 220 and into the positive end of lower battery 204. This effectively transfers charge from upper battery 202 to lower battery 204 during ON times. Those skilled in the art will appreciate that if lower battery 204 had a greater charge than upper battery 202, then the current flow directions would be opposite in upper and lower windings 218, 220 of transformer T1 and an induced current would flow into the positive terminal of upper battery 202 in response to a drive current flowing out of the positive end of lower battery 204 into the dot end of lower winding 220.

Assuming that the upper battery 202 has a greater charge than the lower battery 204, the respective magnitudes of the current driven by upper battery 202 into upper winding 218 is a function of: (i) the combined impedances of upper battery 202, upper winding 218 (including leakage inductance), and the impedance of transistor Q1; and (ii) the reflected parallel combination of impedances of lower battery 204, lower winding 220, and lower capacitor C2. Advantageously, lower capacitor C2 is effectively in parallel with lower winding 220 (and its leakage inductance) during the ON times of the switching circuit 212 and, therefore, reduces the impedance reflected to upper winding 218. Consequently, the magnitude of the drive current from upper battery 202 into upper winding 218 is higher than it would be without lower capacitor C2.

Again, assuming upper battery 202 has a higher charge than lower battery 204, when the gate drive circuit 216 substantially simultaneously disconnects upper and lower windings 218, 220 from upper and lower batteries 202, 204, respectively (i.e., during OFF times), the transformer reset circuit 214 is preferably operable to provide a current path for a reset current to flow into the dot end of upper winding 218, through capacitor C2, and through diode D1. This charges capacitor C2 with the energy stored in the transformer T1 during the ON time. Thus, when gate drive circuit 216 turns ON transistors Q1 and Q2, thereby coupling capacitor C2 in parallel with lower battery 204, the elevated charge on capacitor C2 from the reset current charges lower battery 204, thereby tending to equalize batteries 202 and 204.

When lower battery 204 has a greater charge than upper battery 202, during ON times lower battery 204 drives current into the dot end of lower winding 220 such that an induced current flows out of the dot end of upper winding 218 and into at least one of: (i) upper capacitor C1; and (ii) upper battery 202, thereby tending to equalize the charge on upper and lower batteries 202, 204.

When the switching circuit 216 turns transistors Q1 and Q2 OFF, the transformer reset circuit 214 is preferably operable to provide a current path for a reset current to flow into the dot end of lower winding 220, through diode D1 and into at least one of: (i) capacitor C1; and (ii) upper battery 202, thereby tending to equalize the charges on upper and lower batteries 202 and 204 during OFF times. Those skilled in the art will appreciate that any charge transferred to upper capacitor C1 via the reset current would eventually be transferred to upper battery 202 to the extent that the terminal voltage across upper capacitor C1 exceeded the voltage of upper battery 202.

Figure 4:
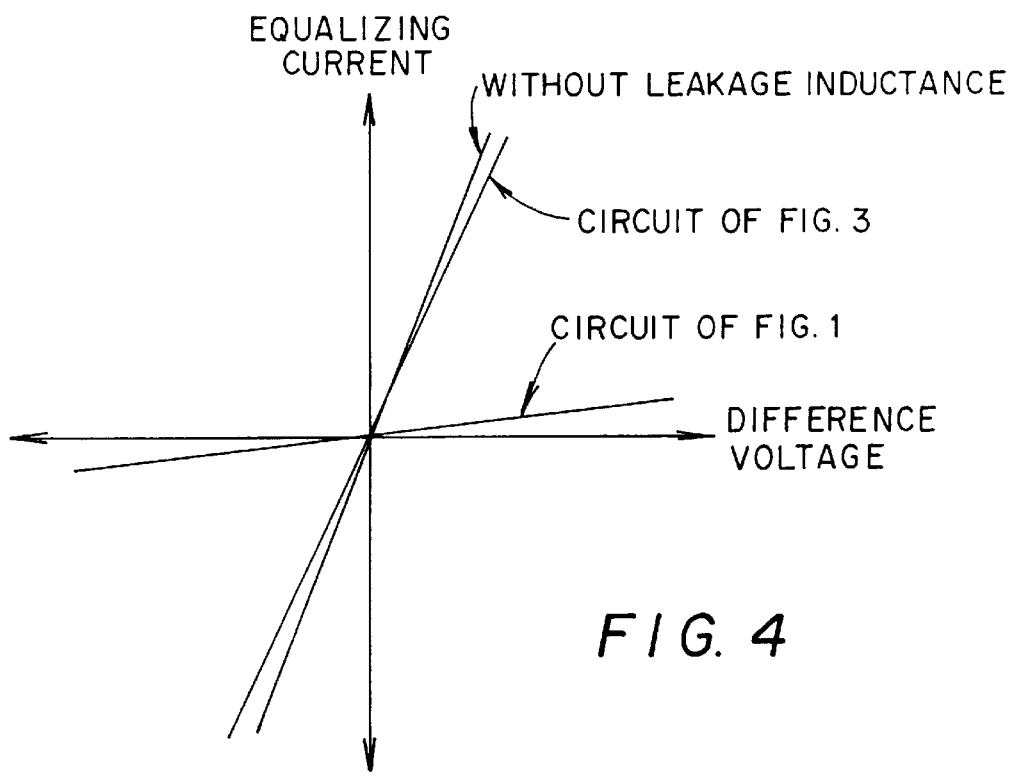
FIG. 4 is a graph illustrating comparisons of equalization current magnitudes which are achievable in the circuits of FIGS. 1 and 3.

Referring now to FIG. 4, the magnitude of the equalizing current versus voltage differences between upper and lower batteries 202, 204 is shown under the following conditions: (i) without leakage inductance (i.e., an ideal condition); (ii) with leakage inductance and no compensating circuitry (i.e., the circuit of FIG. 1); and (iii) with leakage inductance and the circuit of FIG. 3. Advantageously, the magnitude of equalizing currents flowing in the circuit of FIG. 3. are substantially greater than those flowing in the circuit of FIG. 1. Therefore, equalization as between upper and lower batteries 202, 204 may be more quickly achieved using the circuit of FIG. 3.

Figure 5:
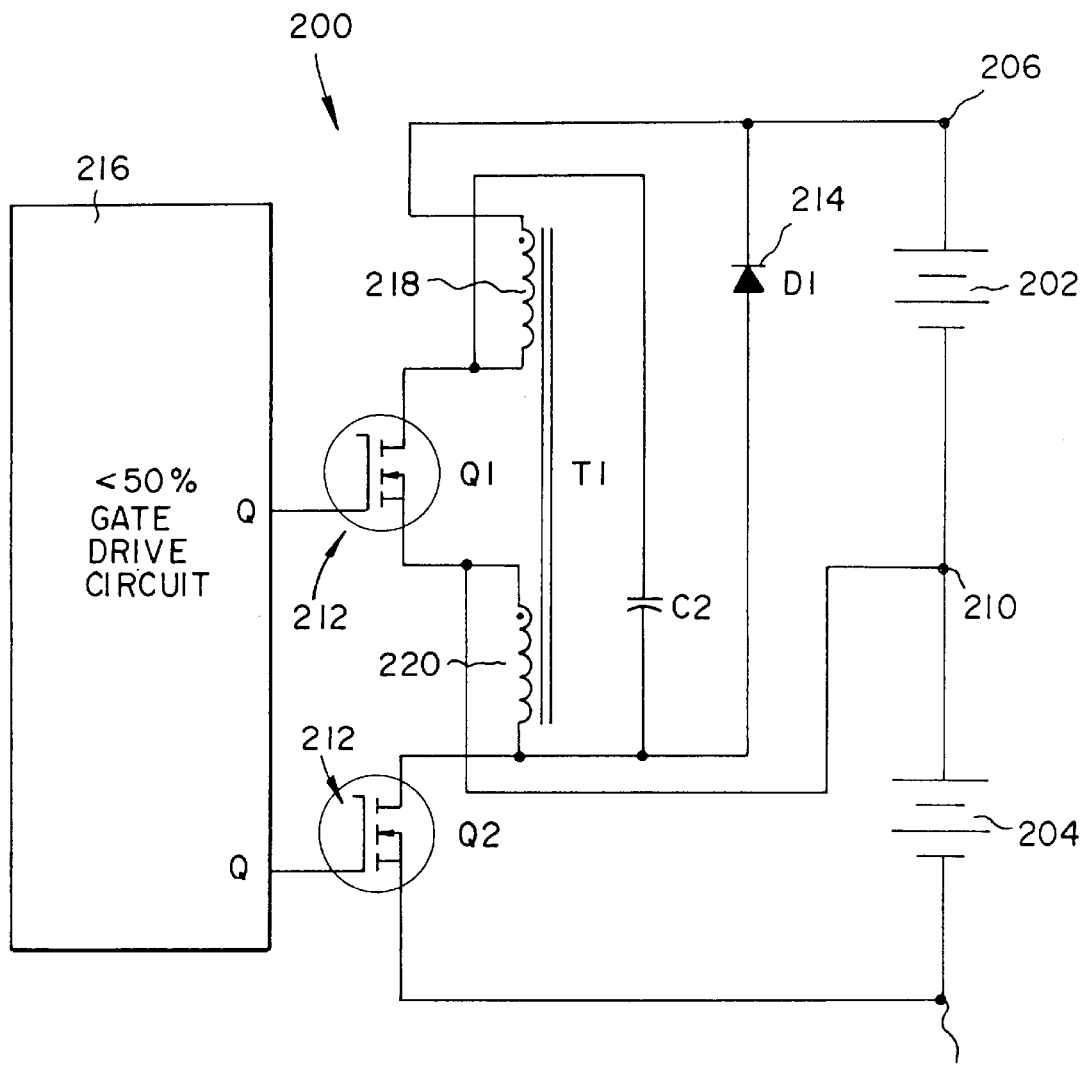
FIG. 5 is an alternative embodiment of the battery equalization circuit of FIG. 3.

Referring now to FIG. 5, an alternative embodiment of the equalizer circuit 200 of FIG. 3, is shown. The equalizer circuit 200 of FIG. 5 is substantially similar to the circuit of FIG. 3 with the exception that upper capacitor C1 is not utilized. The operation of the circuit of FIG. 5 is substantially similar to the operation of the circuit of FIG. 3 except that neither induced currents, reset currents, nor charging currents flow through capacitor C1. The charging and/or discharging of capacitor C2, however, is the same as in the circuit of FIG. 3.

Figure 6:
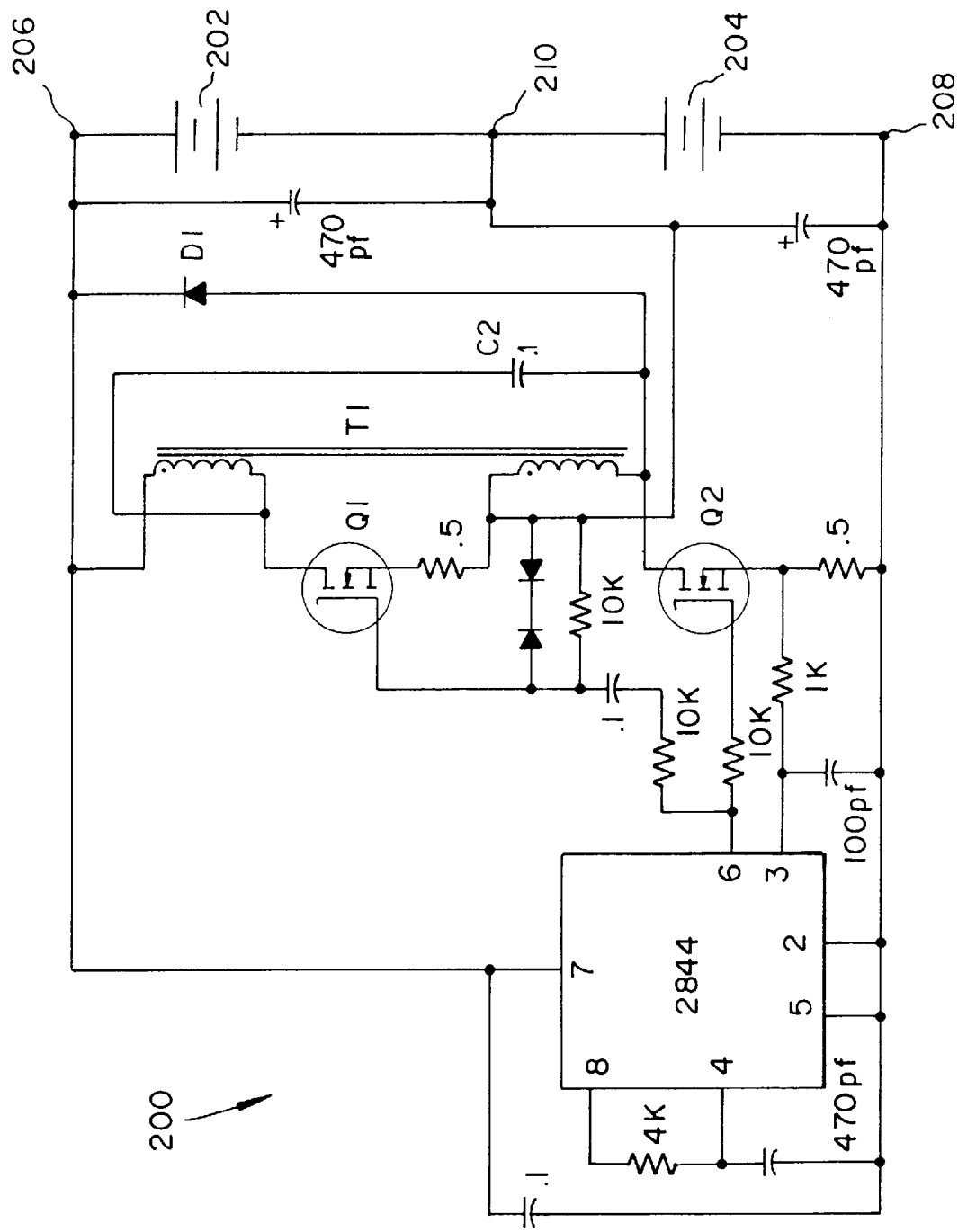
FIG. 6 is a more detailed schematic of the charge equalization circuit of FIG. 5.

Reference is now made to FIG. 6, in which is illustrated a more detailed schematic diagram for implementing the equalization circuit 200 of FIG. 5. Those skilled in the art will appreciate that the particular circuit components and configurations are shown by way of example only and that many modifications and variations may be made without departing from the scope of the invention.

It is most preferred that the charge equalization circuit of the present invention be implemented on a circuit card which is disposed proximate to batteries 102 and 104. When the number of batteries exceeds 2, for example, 3, 4, 5, 6 etc., one charge equalization circuit 300 may be employed for each pair of batteries.

Advantageously, no synchronization or other control signals need be shared between charge equalization circuits for other pairs of batteries (i.e., each charge equalization circuit is autonomous). The charge equalization circuits are thus distributed at the batteries for most convenient and safe operation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A battery equalization circuit for equalizing charge between at least first and second series connected batteries, each battery including a positive end and a negative end, with the positive end of the second battery being coupled to the negative end of the first battery at a common node, the battery equalization circuit comprising:

a switching circuit connectable to (i) the positive end of the first battery at a positive node, and (ii) the negative end of the second battery at a negative node;

a transformer having first and second magnetically coupled windings, each winding having a first end defining a polarity of the winding and a second opposing end; and a transformer reset circuit coupled from the windings of the transformer to the positive and negative nodes, the switching circuit being operable to simultaneously couple the first and second windings in parallel with the first and second batteries, respectively, in the same polarity such that a charge is transferred between the first and second batteries as a function of a charge imbalance therebetween, and the transformer reset circuit being operable to couple one of the first and second windings in parallel with one of the first and second batteries in an opposite polarity to direct reset current from the transformer to that battery to decrease the charge imbalance therebetween.

2. The battery equalization circuit of claim 1, wherein the transformer reset circuit is further operable to couple the first and second windings in parallel with the second and first batteries, respectively, in an opposite polarity to direct reset current from the transformer to the batteries when no charge imbalance is present therebetween.

3. The battery equalization circuit of claim 1, wherein: the switching circuit includes a first switching transistor coupled at one end to the positive node, and a second switching transistor coupled at one end to the negative node; and the first end of the first winding of the transformer is coupled to an opposing end of the first switching transistor, the first end of the second winding is coupled to an opposing end of the second switching transistor, and the second end of the first winding is coupled to the first end of the second winding.

4. The battery equalization circuit of claim 1, further comprising a drive circuit operable to bias the first and second switching transistors ON and OFF substantially simultaneously at a duty cycle less than about 50%.

5. The battery equalization circuit of claim 1, wherein the transformer reset circuit comprises:

a first diode having an anode coupled to the second end of the second winding and a cathode coupled to the positive node; and a second diode having an anode coupled from the negative node and a cathode coupled to the first end of the first winding.

6. The battery equalization circuit of claim 1, wherein the first and second switching transistors are MOSFETs connected such that: (i) a drain of the first switching transistor is coupled to the positive node and a source of the first switching transistor is coupled to the first end of the first winding; and (ii) a drain of the second switching transistor is coupled to the second end of the second winding and a source of the second switching transistor is coupled to the negative node.

7. The battery equalization circuit of claim 1, wherein the first and second batteries are battery cells forming at least part of a battery unit.

8. A battery equalization circuit for equalizing charge between at least first and second series connected batteries, each battery including a positive end and a negative end, where the positive end of the second battery is coupled to the negative end of the first battery at a common node, the battery equalization circuit comprising:

a first switching transistor connectable at one end to the positive end of the first battery at a positive node;

a second switching transistor connectable at one end to the negative end of the second battery at a negative node;

a transformer having first and second magnetically coupled windings, each winding having a first end defining a polarity of the winding and a second opposing end such that: (i) the first end of the first winding is coupled to an opposing end of the first switching transistor, (ii) the second end of the second winding is coupled to an opposing end of the second switching transistor, and (iii) the second end of the first winding is coupled to the first end of the second winding;

a first diode having an anode coupled to the second end of the second winding and a cathode coupled to the positive node;

a second diode having an anode coupled from the negative node and a cathode coupled to the first end of the first winding; and a drive circuit operable to bias the switching transistors ON and OFF substantially simultaneously at ON and OFF times, respectively, and at a duty cycle always less than 50%.

9. The battery equalization circuit of claim 8, wherein:

the first and second switching transistors simultaneously couple the first and second windings in parallel with the first and second batteries, respectively, in the same polarity during the ON times; and one of the first and second batteries having greater charge drives a current into a corresponding one of the first and second windings such that an induced current flows out of the other of the first and second windings and into the other of the first and second batteries having a lesser charge such that charge between the first and second batteries tends to equalize during ON times.

10. The battery equalization circuit of claim 9, wherein: the first and second switching transistors simultaneously disconnect the first and second windings from the first and second batteries, respectively, during OFF times; and one of the first and second diodes provides a path for a reset current to flow through the corresponding one of the first and second windings and into the other of the first and second batteries having a lesser charge such that charge between the first and second batteries tends to equalize during OFF times.

11. A method of equalizing charge between at least first and second series connected batteries, each battery including a positive end and a negative end, where the positive end of the second battery is coupled to the negative end of the first battery at a common node, the method comprising the acts of:

simultaneously connecting first and second magnetically coupled windings of a transformer in parallel with the first and second batteries, respectively, in the same polarity such that one of the first and second batteries having greater charge drives a current into a corresponding one of the first and second windings;

causing an induced current to flow out of the other of the first and second windings and into the other of the first and second batteries having a lesser charge such that charge between the first and second batteries tends to equalize;

simultaneously disconnecting the first and second windings of the transformer from the first and second batteries; and providing a current path for a reset current to flow through the corresponding one of the first and second windings and into the other of the first and second batteries having lesser charge such that charge between the first and second batteries tends to equalize.

12. The method of claim 11, wherein the act of simultaneously disconnecting the first and second windings from the first and second batteries is carried out using the first and second switching transistors.

13. The method of claim 11, wherein the act of simultaneously connecting the first and second windings in parallel with the first and second batteries is carried out using:
   a first switching transistor coupled at one end to the positive end of the first battery at a positive node; and
   a second switching transistor coupled at one end to the negative end of the second battery at a negative node;
   wherein each winding of the transformer includes a first end defining a polarity of the winding and a second opposing end such that: (i) the first end of the first winding is coupled to an opposing end of the first switching transistor, (ii) the first end of the second winding is coupled to an opposing end of the second switching transistor, and (iii) the second end of the first winding is coupled to the first end of the second winding.

14. The method of claim 13, wherein the act of providing a current path for a reset current to flow through the corresponding one of the first and second windings is carried out using:
   a first diode having an anode coupled to the second end of the second winding and a cathode coupled to the positive node; and
   a second diode having an anode coupled from the negative node and a cathode coupled to the first end of the first winding.

15. A battery equalization circuit for equalizing charge between at least first and second series connected batteries, each battery including a positive end and a negative end, where the negative end of the first battery is connectable to a negative node of the equalization circuit, the positive end of the first battery is coupled to the negative end of the second battery and connectable to a common node of the equalizer circuit, and the positive end of the second battery is connectable to a positive node of the equalizer circuit, the battery equalization circuit comprising:
   a transformer having first and second magnetically coupled windings, each winding having a first end defining a polarity of the winding and a second opposing end;
   a first capacitor;
   a transformer reset circuit coupled from the first winding of the transformer to the positive node; and
   a switching circuit operable during ON times to (i) simultaneously couple the first and second windings in parallel with the first and second batteries, respectively, in the same polarity; and (ii) couple the first capacitor in parallel with the first winding.

16. The battery equalization circuit of claim 15, wherein, during the ON times, one of the first and second batteries having greater charge drives a current into a corresponding one of the first and second windings, and an induced current flows out of the other of the first and second windings and into the other of the first and second batteries having a lesser charge such that charge between the first and second batteries tends to equalize during the ON times.

17. The battery equalization circuit of claim 15, wherein the second battery drives a current into the second winding and an induced current flows out of the first winding and charges at least one of the first battery and the first capacitor: (i) during ON times; and (ii) when the second battery has a greater charge than the first battery.

18. The battery equalization circuit of claim 17, wherein respective magnitudes of the current driven into the second winding and the induced current flowing out of the first winding are functions of a parallel combination of impedances of the first capacitor, the first winding, and the first battery.

19. The battery equalization circuit of claim 17, wherein:
   the switching circuit is operable to simultaneously disconnect the first and second windings of the transformer from the first and second batteries during OFF times; and
   the transformer reset circuit is operable to provide a current path for a reset current to flow through the second winding and into the first capacitor such that the first capacitor charges during OFF times.

20. The battery equalization circuit of claim 19, wherein at least some of the charge on the first capacitor from the reset current during the OFF times charges the first battery during the ON times.

21. The battery equalization circuit of claim 15, wherein the first battery drives a current into the first winding and an induced current flows out of the second winding and charges the second battery: (i) during ON times; and (ii) when the first battery has a greater charge than the second battery.

22. The battery equalization circuit of claim 21, wherein:
   the switching circuit is operable to simultaneously disconnect the first and second windings of the transformer from the first and second batteries during OFF times; and
   the transformer reset circuit is operable to provide a current path for a reset current to flow through the first winding and into the second battery such that charge between the first and second batteries tends to equalize during the OFF times.

23. The battery equalization circuit of claim 15, wherein:
   the switching circuit includes a first switching transistor coupled from the negative node to the second end of the first winding of the transformer, and a second switching transistor coupled from the second end of the second winding of the transformer to: (i) the common node, and (ii) the first end of the first winding; and
   the first end of the second winding of the transformer is coupled the positive node.

24. The battery equalization circuit of claim 15, further comprising a drive circuit operable to bias the first and second switching transistors ON and OFF substantially simultaneously at a duty cycle less than 50%.

25. The battery equalization circuit of claim 15, wherein the transformer reset circuit comprises a diode having an anode coupled to the second end of the first winding and a cathode coupled to the positive node.

26. The battery equalization circuit of claim 15, wherein the first and second switching transistors are MOSFETs connected such that: (i) a source of the first switching transistor is coupled to the negative node and a drain of the first switching transistor is coupled to the second end of the first winding; and (ii) a drain of the second switching transistor is coupled to the second end of the second winding and a source of the second switching transistor is coupled to the common node.

27. The battery equalization circuit of claim 15, wherein the first and second batteries are battery cells forming at least part of a battery unit.

28. A battery equalization circuit for equalizing charge between at least first and second series connected batteries, each battery including a positive end and a negative end, where the negative end of the first battery is connectable to a negative node of the equalization circuit, the positive end of the first battery is coupled to the negative end of the second battery and connectable to a common node of the equalizer circuit, and the positive end of the second battery is connectable to a positive node of the equalizer circuit, the battery equalization circuit comprising:

a transformer having first and second magnetically coupled windings, each winding having a first end defining a polarity of the winding and a second opposing end;

a first capacitor;

a second capacitor coupled from the positive node to the common node; a transformer reset circuit coupled from the first winding of the transformer to the positive node; and a switching circuit operable during ON times to (i) simultaneously couple the first and second windings in parallel with the first and second batteries, respectively, in the same polarity; and (ii) couple the first capacitor in parallel with the first winding.

29. The battery equalization circuit of claim 28, wherein, during the ON times, one of the first and second batteries having greater charge drives a current into a corresponding one of the first and second windings, and an induced current flows out of the other of the first and second windings and into the other of the first and second batteries having a lesser charge such that charge between the first and second batteries tends to equalize during the ON times.

30. The battery equalization circuit of claim 28, wherein the second battery drives a current into the second winding and an induced current flows out of the first winding and charges at least one of the first battery and the first capacitor: (i) during ON times; and (ii) when the second battery has a greater charge than the first battery.

31. The battery equalization circuit of claim 30, wherein respective magnitudes of the current driven into the second winding and the induced current flowing out of the first winding are functions of a parallel combination of impedances of the first capacitor, the first winding, and the first battery.

32. The battery equalization circuit of claim 30, wherein:
the switching circuit is operable to simultaneously disconnect the first and second windings of the transformer from the first and second batteries during OFF times; and
the transformer reset circuit is operable to provide a current path for a reset current to flow through the second winding and into the first capacitor such that the first capacitor charges during the OFF times.

33. The battery equalization circuit of claim 32, wherein at least some of the charge on the first capacitor from the reset current during the OFF times charges the first battery during the ON times.

34. The battery equalization circuit of claim 28, wherein the first battery drives a current into the first winding and an induced current flows out of the second winding and charges at least one of the second battery and the second capacitor: (i) during ON times; and (ii) when the first battery has a greater charge than the second battery.

35. The battery equalization circuit of claim 34, wherein respective magnitudes of the current driven into the first winding and the induced current flowing out of the second winding are functions of a parallel combination of impedances of the second capacitor, the second winding, and the second battery.

36. The battery equalization circuit of claim 34, wherein:
the switching circuit is operable to simultaneously disconnect the first and second windings of the transformer from the first and second batteries during OFF times; and
the transformer reset circuit is operable to provide a current path for a reset current to flow through the first winding and into at least one of the second battery and the second capacitor such that the second battery charges during the OFF times.

37. The battery equalization circuit of claim 36, wherein at least some of the charge on the second capacitor from the reset current during the OFF times charges the second battery during the ON times.

38. The battery equalization circuit of claim 28, wherein:
the switching circuit includes a first switching transistor coupled from the negative node to the second end of the first winding of the transformer, and a second switching transistor coupled from the second end of the second winding of the transformer to: (i) the common node, and (ii) the first end of the first winding; and
the first end of the second winding of the transformer is coupled the positive node.

39. The battery equalization circuit of claim 28, further comprising a drive circuit operable to bias the first and second switching transistors ON and OFF substantially simultaneously at a duty cycle less than about 50%.

40. The battery equalization circuit of claim 28, wherein the transformer reset circuit comprises a diode having an anode coupled to the second end of the first winding and a cathode coupled to the positive node.

41. The battery equalization circuit of claim 28, wherein the first and second switching transistors are MOSFETs connected such that: (i) a source of the first switching transistor is coupled to the negative node and a drain of the first switching transistor is coupled to the second end of the first winding; and (ii) a drain of the second switching transistor is coupled to the second end of the second winding and a source of the second switching transistor is coupled to the common node.

42. The battery equalization circuit of claim 28, wherein the first and second batteries are battery cells forming at least part of a battery unit.

* * * * *